Sept. 20, 1938.  C. H. WILLIS ET AL  2,130,440

ELECTRIC VALVE CIRCUITS

Filed Jan. 30, 1936

Inventors:
Clodius H. Willis,
Burnice D. Bedford,
Frank R. Elder,
by Harry E. Dunham
Their Attorney.

Patented Sept. 20, 1938

2,130,440

UNITED STATES PATENT OFFICE 2,130,440

ELECTRIC VALVE CIRCUITS

Clodius H. Willis, Princeton, N. J., and Burnice D. Bedford and Frank R. Elder, Schenectady, N. Y., assignors to General Electric Company, a corporation of New York Application January 30, 1936, Serial No. 61,508

11 Claims. (Cl. 177—311)

Our invention relates to electric circuits employing electric valves and in particular to electric circuits for indicating operating conditions and electrical characteristics of electric valve circuits.

In electric valve circuits, particularly in power circuits employing electric valves of the vapor electric discharge type, it is frequently desirable to provide means for indicating electrical characteristics of the electric valves and of the associated circuits in order to facilitate the location of faults. These indicating systems must be readily adaptable to electric valve circuits generally and must be simple and reliable in operation in order to indicate or record accurately the operating condition which is being studied. It is further desirable that the apparatus for the indicating systems be of an inexpensive nature and be readily adaptable to the electric valve circuits without necessitating material alteration in the apparatus of those circuits or in the manner in which the apparatus functions.

An object of our invention is to provide an improved indicating circuit for indicating the condition of operation of an electric valve.

Another object of our invention is to provide a system for indicating normal and abnormal operation of an electric valve circuit and which will operate rapidly to perform this function in a simple and reliable manner.

A further object of our invention is to provide a system for electric valve circuits which affords one indication when the valve circuit is operating properly and which affords a different indication when the electric valve circuit departs from the normal condition of operation.

In accordance with the illustrated embodiment of our invention, an operating condition of an electric valve or an associated circuit is indicated by utilizing an electrical characteristic of an excitation circuit for the electric valves. In the particular system illustrated and described hereinafter, a glow discharge valve is associated with the control member circuit for the electric valve to indicate when the electric valve is operating in a predetermined manner and also to indicate when the electric valve departs from normal operation.

Figure 1:
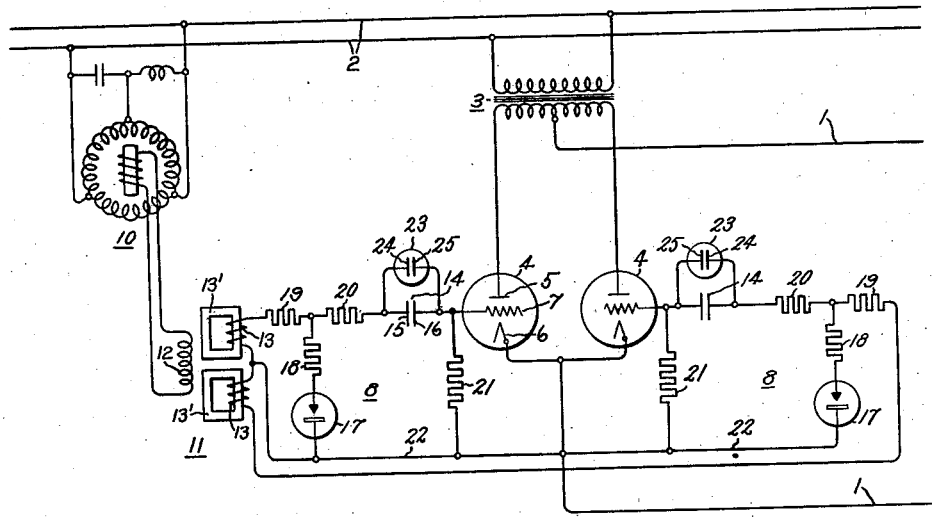
Figure 2:
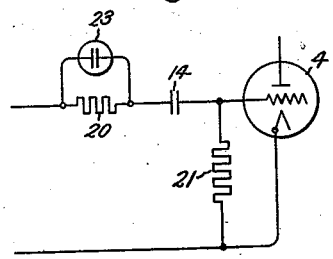
Figure 3:
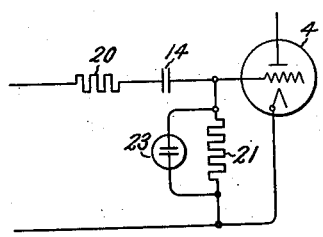
Figure 4:
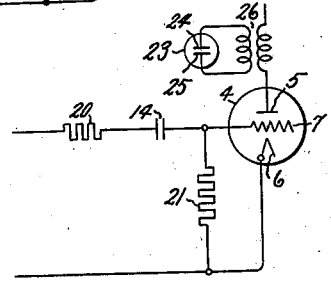

For a better understanding of our invention, together with other and further objects thereof, reference may be had to the following description taken in conjunction with the accompanying drawing, and its scope will be pointed out in the appended claims. Fig. 1 is a diagrammatical representation of one embodiment of our invention as applied to an electric valve translating circuit for transmitting energy between an alternating current and a direct current circuit, while Figs. 2, 3, and 4 are simple diagrammatical representations of modifications of our invention.

Referring to Fig. 1 of the drawing, our invention is diagrammatically illustrated as applied to an electric valve translating circuit for transmitting energy between an alternating current circuit and a direct current circuit. The particular electric valve translating circuit described in Fig. 1 is arranged to transmit electrical energy from the direct current circuit 1 to the alternating current circuit 2 through any suitable inverting apparatus diagrammatically illustrated as comprising a transformer 3 and electric valves 4, preferably of the vapor electric type, each having an anode 5, a cathode 6 and a control member or electrode 7.

Each of the electric valves 4 is provided with an excitation circuit 8 which may comprise a source of alternating current such as circuit 2, or any other alternating current source, the phase of which may be adjusted relative to the phase of the voltage applied between the anodes and cathodes of electric valve 4 by means of any conventional phase shifting device, such as the rotary phase shifting arrangement 10. A transformer 11 having a primary winding 12 and secondary windings 13 may be employed to supply a voltage of suitable value to the respective excitation circuits 8. The transformer 11 is provided with separate magnetic circuits 13' and may be of the type to provide a voltage of peaked wave form or a voltage having a substantially perpendicular wave front. A capacitance 14 having plates 15 and 16 is provided in each of the excitation circuits 8 to impress a bias voltage upon the control electrode 7 of electric valves 4. A unidirectional conducting device 17 is connected across the terminals of each of the secondary windings 13 through a resistance 18 and a resistance 19. To limit the current flowing in the excitation circuit, a resistance 20 is connected in series with the resistance 19 and the capacitance 14. To provide a suitable leakage path for condenser 14 when there is no positive ion current in the electric valve 4, a resistance 21 is connected between the control electrode 7 and the cathode 6. A conductor 22 is employed to connect the cathode 6 of electric valve 4 and the unidirectional device 17 to the secondary winding 13 of transformer 11.

In order to obtain an indication of a condition of operation of the electric valve 4 or to obtain an indication of the condition of conductivity of the electric valve 4, any suitable potential responsive device having a critical potential operating characteristic, such as a glow discharge valve 23, may be employed to afford a visual indication of the operating condition of the valve. The glow discharge valve 23 is provided with electrodes 24 and 25 which under certain operating conditions are rendered luminescent to afford the desired luminescent indication. In one embodiment of my invention, the glow discharge valve 23 is connected in the capacitance 14 and may be responsive to the bias voltage appearing across the capacitance 14.

Figs. 2 and 3 are simplified diagrammatical representations of modifications of our invention. Referring to Fig. 2, the glow discharge valve 23 is shown connected across the resistance 20. When the circuit is arranged in this manner, the potential variations across the resistance 20 are substantially the same as across the capacitance 14 and may be utilized to provide energization of the glow discharge valve 23 and to provide an indication of the operating condition of electric valve 4. Referring to Fig. 3, a further modification is shown in which the glow discharge valve 23 is connected across the resistance 21.

The operation of the embodiment of our invention diagrammatically represented in Fig. 1 of the drawing will be explained by considering the operation of the translating circuit when current is being supplied to the alternating current circuit 2 from the direct current circuit 1, through the transformer 3 and the electric valves 4. In the manner well understood by those skilled in the art, the electric valves 4 will be rendered alternately conductive by the respective excitation circuits 8 to conduct current to the load circuit 2. If the electric valves 4 are of the vapor electric type, it will be understood that these valves may be maintained non-conductive during predetermined intervals of the positive half cycle of anode-cathode potential by impressing upon the respective control electrodes 7 a potential less than the critical potential determined by the characteristic of the particular valve employed. It will be further understood that after these valves have been rendered conductive by impressing upon the control electrode 7 a potential greater than, or more positive than, the critical control potential, the control electrodes are ineffective to render the valve non-conductive and that the valves may be made non-conductive only by rendering the anodes negative relative to the respective cathodes for a time equal to, or greater than, the time of deionization of a particular valve employed.

If it be assumed that the potential appearing across the upper secondary winding 13 is in a direction tending to establish a positive potential upon the plate 15 of capacitance 14, positive current will flow through resistance 19 and resistance 20, through capacitance 14, and through electric valve 4 by means of control electrode 7 and cathode 6, to the secondary winding 13 by means of conductor 22. When such a potential is impressed upon the excitation circuit 8, the electric valve 4 will be rendered conductive and during this period there will be established upon plate 16 of capacitance 14 a negative charge which will be effective to establish in the excitation circuit the negative bias voltage. During this positive half cycle of alternating potential supplied by the upper secondary winding 13, the unidirectional conducting device 17 will be non-conductive inasmuch as the potential existing across its terminals is opposite to that required for the device to conduct under normal operating conditions; that is, when the circuit is effective to establish the negative bias voltage by means of the capacitance 14 the electrode 25 of the glow discharge valve 23 will be rendered luminescent to indicate that the circuit is operating normally.

During the negative half cycle of alternating potential appearing across the terminals of the upper secondary winding 13 of transformer 11, the potential appearing across the terminals of unidirectional conducting device 17 will be in a direction to cause the device to conduct current through resistance 18 and resistance 19. The effect of this conduction will be to prevent the positive charge which has accumulated upon plate 15 of capacitance 14 during the positive half cycle from discharging through the resistances 20 and 19 by tending to maintain positive the plate of condenser 14. In other words, during abnormal operation of the electric valve 4, the current which is conducted through the circuit including the control member 7 alters the negative biasing potential. The resistance 21 will be effective to prevent the negative charge which has accumulated upon plate 16 of capacitance 14 from flowing to the conductor 22 which, during the negative half cycle of alternating potential, is positive relative to the plate 16. Since the voltage appearing across the capacitance 14 during the negative half cycle of alternating potential is not materially disturbed during normal operation, the electric discharge valve 23 will afford the same indication as was afforded during the positive half cycle of alternating potential; that is, the electrode 25 will be maintained luminescent.

The glow discharge valve 23 will operate to afford a different indication if the electric valve 4 is not operating normally. If it be assumed that for any reason the electric valve 4 arcs-back, that is, conducts positive current from the cathode 6 to the anode 5, the glow discharge valve 23 will indicate such abnormal operation by indicating two luminescent electrodes. In other words, under this type of fault condition, electrode 24 will be rendered luminescent. When current flows in the reverse direction in electric valves 4 under arc-back conditions or otherwise, the positive ions of the ionizable medium in the electric valve 4 will tend to collect upon the control electrode 7 more than for normal operation and in this manner will neutralize the negative charge accumulated on plate 16 of capacitance 14. This condition will result in an intermittent luminescent effect or a flickering produced by irregular variation in the potential appearing across the capacitance 14.

The operation of the modification of our invention as diagrammatically illustrated in Fig. 2 is similar to the operation of the embodiment described in connection with Fig. 1. The potential variations appearing across the resistance 20 will be similar to the potential variations appearing across the capacitance 14 under normal operating conditions, that is, during those conditions in which the bias is maintained by virtue of the capacitance 14, the potential difference across the terminals of resistance 20 will maintain the same relative polarity to render luminescent one of the electrodes of the glow discharge valve 23. Under abnormal operating conditions, that is, when the excitation circuit 8 fails to maintain the desired bias voltage, the irregular variation in potential across the resistance 20 will result in an intermittent luminescent effect.

The modification of our invention shown in Fig. 3 operates in a manner similar to that described in connection with Figs. 1 and 2. The voltage appearing across the resistance 21 during normal operation will have the same polarity. Hence this voltage drop may also be utilized to energize the glow discharge valve to indicate an electrical operating condition of the valve 4. Upon the occurrence of an abnormal operating condition, the voltage appearing across the resistance 21 will be substantially changed to effect alteration in the indication afforded by the glow discharge valve 23.

Although the operation of the glow discharge valve has been explained under normal conditions and under only one fault condition in the particular embodiments shown, it will be understood that the valve may indicate other conditions indicative of abnormal operation of the main electric valve. Under certain conditions of abnormal operation, the glow discharge valve 23 will afford an indication of such operation by showing only one luminescent electrode, such as the electrode 25, in the above described system where the disturbance causes a relatively fixed voltage condition in the excitation circuit. Under other abnormal conditions, both electrodes 24 and 25 may be rendered luminescent where the nature of the fault causes an intermittent reversal in the potential applied to the terminals of the glow discharge valve 23.

Referring to the modified embodiment of our invention diagrammatically illustrated in Fig. 4 of the drawing, the glow discharge valve 23 is energized in response to the energization of the anode circuit of electric valve 4. Any suitable electro-responsive means, such as a transformer 26, may be employed to energize the glow discharge valve 23. Since the electric valve 4 normally conducts current in only one direction, and since the voltage induced in the secondary winding of transformer 26 will be asymmetrical only one electrode of glow discharge valve 23 will be rendered luminescent under normal operating conditions. Any change in the condition of luminescence of glow discharge valve 23 will afford an indication of abnormal operation of the electric valve 4.

Although our invention has been diagrammatically represented as associated with an excitation circuit and an anode circuit of an electric valve for indicating a condition of operation of the electric valve, it should be understood that our invention may be applied to electric valve circuits generally and that the indicating device 23 may be associated in other ways with electric valve circuits to obtain a desired indication in response to an operating condition or an electrical characteristic of valve circuits as will be apparent to those skilled in the art without departing from our invention in its broader aspects.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In combination, an electric circuit, electric valve means connected therein, and polarity responsive means comprising an electric discharge device of the glow type having a plurality of electrodes and connected to be energized in accordance with the condition of conductivity of said valve means so that said device affords one luminescent condition for normal operation of said valve means and another luminescent condition for irregular operation of said valve means.

2. In combination, an electric circuit, electric valve means connected therein, and means comprising an electric discharge device having a pair of electrodes and connected to be energized in accordance with a potential of said valve means, said potential being of one polarity during normal operation of said electric valve means so that one of said electrodes is rendered luminescent for normal operation of said valve and both of said electrodes are rendered luminescent for faulty operation of said valve means.

3. In combination, an electric circuit, electric valve means connected therein, an excitation circuit for controlling the conductivity of said valve means, and means associated with said excitation circuit comprising a device having a critical potential operating characteristic and being connected in said excitation circuit to be responsive to a potential thereof which is of one polarity during normal operation of said electric valve means and which is of opposite polarity under faulty operation of said electric valve means to produce different luminescent indications for normal and faulty operation of said electric valve means.

4. In combination, an electric circuit, an electric valve connected therein, an excitation circuit for controlling the conductivity of said valve, and means comprising a glow discharge valve associated with said excitation circuit and being connected to be responsive to a potential thereof which is of one polarity during normal operation of said electric valve and which is of a different polarity during faulty operation thereof so that said glow discharge valve produces one luminescent indication for normal operation of said electric valve and a different luminescent indication for faulty operation of said electric valve.

5. In combination, an electric circuit, an electric valve having a control member connected therein, an excitation circuit for controlling the conductivity of said valve and comprising high impedance means for normally impressing a predetermined biasing voltage upon said control member, said biasing voltage being altered by current flow in said control member under faulty operation of said electric valve, and means responsive to said bias voltage for indicating normal and faulty operation of said electric valve.

6. In combination, an electric circuit, an electric valve connected therein and having a control member, an excitation circuit for said valve comprising a source of alternating current, high impedance means for impressing a biasing voltage on said control member, said biasing potential being altered by current flow in said control member during faulty operation of said electric valve, and means responsive to said bias voltage including a glow discharge valve for indicating normal and faulty operation of said valve.

7. In combination, an electric circuit, an electric valve connected therein and having a control member, an excitation circuit for said valve comprising a source of alternating current, high impedance means for impressing a biasing voltage on said control member, said biasing voltage being altered by current flow in said control member under faulty operation of said electric valve, and means responsive to the potential of said control member and including a glow discharge valve for affording one indication during normal operation of said valve and for affording a different indication during faulty operation of said valve.

8. In combination, an electric circuit, an electric valve connected therein having a control member, and an excitation circuit for said valve comprising a source of alternating current, a capacitance connected in series relation with the control member, a unidirectional conducting device connected across the source of alternating current, said source, said capacitance and said device tending to impress a bias voltage on said control member, said bias voltage being altered by current flow in said control member under faulty operation of said electric valve and means responsive to the voltage appearing across said capacitance for indicating normal and faulty operating conditions of said electric valve.

9. In combination, an electric circuit, an electric valve connected therein having a control member, and an excitation circuit for said valve comprising a source of alternating current, a capacitance and a resistance in series relation with said control member tending to maintain a bias voltage on said control member, said bias voltage and the current flow in the series circuit being altered under faulty operation of said electric valve, and means responsive to the voltage across said resistance for indicating normal and faulty operation of said electric valve.

10. In combination, an electric circuit, an electric valve connected therein having an anode, a cathode and a control member, and an excitation circuit for said valve comprising a source of alternating current and a capacitance in series relation with said control member tending to maintain a bias voltage on said control member, said bias voltage being altered under faulty operation of said electric valve, a resistance connected between said cathode and said control member and means comprising a glow discharge valve responsive to an electrical condition of said resistance for indicating normal and faulty operation of said electric valve.

11. In combination, an electric circuit, electric valve means connected therein and having a control member, an excitation circuit for energizing said control member, and means comprising an electric discharge device having a pair of electrodes and being connected to be energized in accordance with a potential of said excitation circuit so that one of said electrodes is rendered luminescent for normal operation of said valve and the other of said electrodes is rendered luminescent to indicate abnormal operation of said valve means.

CLODIUS H. WILLIS.
BURNICE D. BEDFORD.
FRANK R. ELDER.